(12) United States Patent
Knoll et al.

(10) Patent No.: US 7,275,831 B2
(45) Date of Patent: Oct. 2, 2007

(54) DISPLAY DEVICE

(75) Inventors: Peter Knoll, Ettlingen (DE); Johannes Eschler, Ditzingen (DE); Reinhold Fiess, Durbach (DE)

(73) Assignee: Robert Bosch GmbH, Stuttgart (DE)

( * ) Notice: Subject to any disclaimer, the term of this patent is extended or adjusted under 35 U.S.C. 154(b) by 781 days.

(21) Appl. No.: 10/088,727

(22) PCT Filed: Jun. 29, 2001

(86) PCT No.: PCT/DE01/02403

§ 371 (c)(1),
(2), (4) Date: Jul. 19, 2002

(87) PCT Pub. No.: WO02/10837

PCT Pub. Date: Feb. 7, 2002

(65) Prior Publication Data

US 2003/0020880 A1    Jan. 30, 2003

(30) Foreign Application Priority Data

Jul. 27, 2000    (DE)    ................ 100 36 570

(51) Int. Cl.
G03B 21/28    (2006.01)
G02F 1/1335    (2006.01)

(52) U.S. Cl. ............ 353/13; 345/7; 349/11; 348/115

(58) Field of Classification Search ........ 353/11–14, 353/28, 37, 72–78, 119, 122, 10, 21; 359/13, 359/14, 533, 478, 479, 15; 345/87, 207, 345/5, 7, 8, 9; 348/113, 115, 118–120; 349/11
See application file for complete search history.

(56) References Cited

U.S. PATENT DOCUMENTS

| 3,357,769 | A |   | 12/1967 | Thompson |
| 4,348,187 | A | * | 9/1982  | Dotsko ................ 434/44 |
| 4,763,990 | A | * | 8/1988  | Wood .................. 345/7 |
| 4,793,687 | A |   | 12/1988 | Shenker et al. |
| 4,908,611 | A | * | 3/1990  | Iino ................... 353/13 |
| 4,919,517 | A | * | 4/1990  | Jost et al. ............ 359/630 |
| 4,967,191 | A |   | 10/1990 | Iino ................... 353/14 |
| 5,034,732 | A | * | 7/1991  | Iino ................... 353/14 |
| 5,280,540 | A | * | 1/1994  | Addeo et al. ........... 348/14.1 |
| 5,309,238 | A | * | 5/1994  | Bae ................... 348/588 |
| 5,400,045 | A | * | 3/1995  | Aoki .................. 353/14 |
| 6,317,170 | B1 | * | 11/2001 | Hwang et al. .......... 353/31 |
| 6,409,351 | B1 | * | 6/2002  | Ligon ................. 353/98 |
| 6,513,935 | B2 | * | 2/2003  | Ogawa ................ 353/37 |
| 6,750,832 | B1 | * | 6/2004  | Kleinschmidt ......... 345/7 |
| 2002/0171637 | A1 | * | 11/2002 | Kadowaki et al. ...... 345/204 |

FOREIGN PATENT DOCUMENTS

| DE | 38 12 620 | 12/1991 |
| DE | 44 45 555 | 6/1995 |
| DE | 44 18 996 | 12/1995 |
| DE | 195 40 108 | 4/1997 |
| EP | 0 312 094 | 4/1989 |
| EP | 0 519 541 | 12/1992 |
| EP | 0 724 174 | 7/1996 |
| FR | 2 726 094 | 4/1996 |
| GB | 2 269 681 A | * | 2/1994 |

* cited by examiner

*Primary Examiner*—Andrew T Sever
(74) *Attorney, Agent, or Firm*—Kenyon & Kenyon LLP

(57) ABSTRACT

A display apparatus for displaying at least one of images and data in a vehicle has a projection unit and a display surface, the projection unit being arranged on at least one of a vehicle roof and on a vehicle inside mirror. The display surface may be used to display a real image generated by the projection unit.

22 Claims, 3 Drawing Sheets

DISPLAY DEVICE

FIELD OF THE INVENTION

The invention relates to a display apparatus for use in vehicles.

BACKGROUND INFORMATION

Display apparatuses in vehicles, in which a virtual image visible to an observer is generated by the fact that light is projected by a projection unit onto a mirror-coated surface, are conventional. In this context, a virtual image visible to a viewer is created behind the plane of the mirror. A unit for light generation and projection that is necessary for this purpose is generally arranged in the dashboard of the vehicle, i.e. behind the steering wheel and below the windshield. Vehicle data, e.g. the present vehicle speed, are displayed in such a display. On the one hand the windshield, or on the other hand additional reflective elements (called combiners), are used as the reflective surfaces onto which the virtual image is projected.

SUMMARY

The display apparatus according to the present invention may have the advantage that instead of a virtual image, a real image may be generated. Projection of a real image makes it possible to eliminate the image distortion that occurs upon projection of a virtual image, since the real image may be projected directly onto a display surface in a manner visible from several directions. It may be advantageous in this context to arrange a projection apparatus in space-saving fashion on a vehicle roof or on a vehicle inside mirror. It may be advantageous here that for projection of the real image, projection may be performed onto a display surface outside the windshield, since as a result it may be no longer necessary to cover the windshield—which otherwise is merely reflective or transparent—with, for example, a light-diffusing film for projection of the real image. It may be advantageous that because the projection unit may be arranged on the vehicle roof or on the vehicle inside mirror, there may be no need for model-specific configuration of the vehicle dashboard with a receptacle for a projection unit in the dashboard unit.

It may be advantageous to arrange a structural pattern on the display surface. This structural pattern may cause the light directed onto the display surface to be directed in a preferred direction. This preferred direction may generally be the viewing direction of a viewer, for example a driver of the vehicle. The power level of the light radiated onto the display surface may thereby be decreased with no change in the reading brightness. Targeted light deflection may moreover, for example, prevent dazzling of oncoming traffic or of a passenger.

It may be advantageous to arrange adjacently to the display surface a reflective surface that serves to display a virtual image. Projection of the image onto the windshield may thereby be accomplished as applicable. This may be advantageous if an image superimposed on the road scene is to be displayed on the windshield.

It may be advantageous to configure the display surface with a roughened surface, since this may make possible good legibility of the real image if the roughening has sufficient grain.

It may be advantageous to embody the display surface with a holographically introduced structure, which may make possible efficient, low-loss light deflection.

It may be advantageous to arrange on the display surface a surface having at least one of a prism structure and sawtooth structure, with which the light may efficiently be deflected in a selected direction.

It may be advantageous to embody the display surface as a first and a second surface portion, in which context light may be deflected to a first viewer by way of the first surface portion and to a second viewer by way of the second surface portion, so that it may be possible for two viewers of the display apparatus to view different images. For example, while a second viewer is viewing an entertainment program, information about the vehicle, e.g. the vehicle speed or engine speed, may be displayed to a first viewer, for example the driver.

It may be advantageous to equip the projection unit with a laser beam generation unit and to generate an image by way of laser beams, a deflection of the laser beams may be accomplished with mirrors. A bright real image may thereby be generated. It may be possible to dispense with a lens optical system for image generation and projection in the projection unit.

It may be advantageous to provide the projection path approximately parallel to the windshield, since in a region close to the windshield the light path generally is not interrupted by a user of the vehicle.

Example embodiments of the invention are illustrated in the drawings and explained in more detail in the description which follows.

DETAILED DESCRIPTION

The display apparatus according to the present invention may be used to display a variety of images and data in a vehicle. In addition to vehicle parameters such as, for example, engine speed, vehicle speed, and the ambient temperature of the vehicle, it may be possible to display the image from a camera, e.g. the image from a rear or side camera as well as the image from an infrared camera. Display of the image acquired by the infrared camera may allow a vehicle user to obtain a good overview of the road even when visibility conditions are poor, e.g. in fog or darkness. In addition, the display apparatus may also serve as an output unit of a navigation apparatus for display of a route to be traveled. In an example embodiment, a display surface may be arranged at least in the vicinity of the windshield, and may be readable by a driver of the vehicle and by a passenger. Also it may be possible to arrange a display apparatus according to the present invention in such a manner that a passenger who is not in the first row of seats of the vehicle may read the display, for example by the fact that a display surface is arranged directly in front of a user's seat. All that may be necessary for this purpose may be to provide a corresponding projection unit for that display surface at a suitable location on the vehicle roof.

Figure 1:
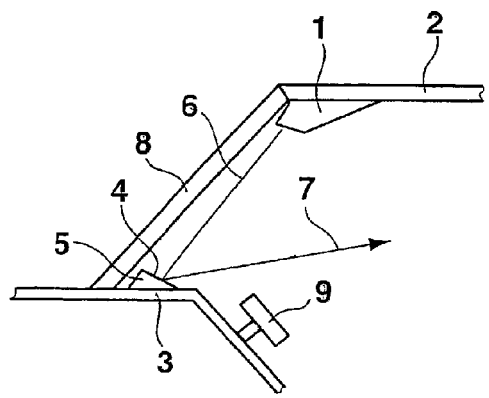
FIG. 1 illustrates an example embodiment of a display apparatus in a vehicle.

FIG. 1 illustrates an example embodiment in which a projection unit 1 may be arranged on a vehicle roof 2. A display surface 4 may be arranged on a mount 5 on an instrument panel 3. A light beam 6 that may be radiated from projection unit 1 to display surface 4 may be deflected by display surface 4 in the direction of a user, as illustrated by an arrow 7. Instrument panel 3 may be adjacent one on side to a windshield 8 that extends from instrument panel 3 to vehicle roof 2. Instrument panel 3 encloses a dashboard of the vehicle. A steering wheel 9 may be also arranged on instrument panel 3.

In an example embodiment, projection unit 1 may be mounted immovably on vehicle roof 2. In an example embodiment, the voltage supply line and the data line may be integrated into vehicle roof 2 in a manner not visible to a user, and may be guided out of the vehicle roof through a door frame. Light beam 6 that passes from projection unit 1 to display surface 4 extends approximately parallel to windshield 8. A driver generally does not reach into this region, so that light beam 6 may be not interrupted by the driver. In an example embodiment, display surface 4 may be embodied as a diffusing display surface, which may be constituted e.g. by roughening an outer surface of a transparent plastic material. Display surface 4 may be a highly reflective surface that is as white as possible and, in an example embodiment, may be covered with a surface material that exhibits approximately the properties of a Lambert radiator. In an example embodiment, display surface 4 may be constituted by a suitable film that may be applied onto mount 5. Mount 5 is moreover adjustable as to its angle of inclination, so that the direction of the observer (arrow 7) may be set by tilting mount 5 to the observer's eye level. In an example embodiment, display surface 4 is covered with a film that may allow directed emission of the light. This prevents light from being emitted, for example, toward the windshield.

Figure 2:
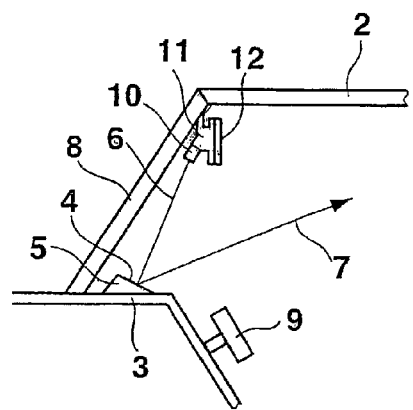
FIG. 2 illustrates another example embodiment of a display apparatus according to the present invention.

FIG. 2 illustrates another example embodiment of a display apparatus according to the present invention. Here and hereinafter, identical reference characters designate identical elements. In the example embodiment illustrated in FIG. 2, a projection unit 10 may be arranged on an inside mirror 11. A mirror surface 12 of inside mirror 11 may be arranged on a side of inside mirror 11 facing away from windshield 8. Mirror surface 12 conceals projection unit 10 from a user as completely as possible, so that projection unit 1 is not visible to a user of the vehicle and thus is not intrusive.

Figure 3:
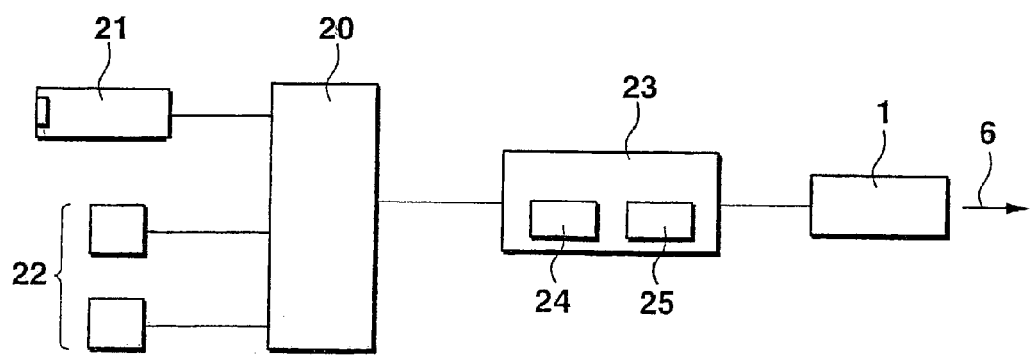
FIG. 3 illustrates an arrangement of various electronic elements of a display apparatus according to the present invention.

FIG. 3 illustrates an electrical circuit of a display apparatus according to the present invention. Signals of a video camera 21 and from vehicle sensors 22 may be acquired by a control unit 20. The signals of video camera 21 and vehicle sensors 22 may be processed in control unit 20 and forwarded for display to an image processing unit 23. In an example embodiment, image processing unit 23 may have a digital filtration and calculation unit 24 with which the image signals acquired by video camera 21 may be optionally digitally processed, and with which the vehicle variables ascertained by vehicle sensors 22, e.g. vehicle speed, engine speed, and outside temperature, may be converted into a visual depiction. Image processing unit 23 furthermore may have an activation unit 25 that transmits image data to projection unit 1 and controls projection unit 1. In an example embodiment, video camera 21 may be arranged behind a radiator grille at the front end of the vehicle, thus making possible unobtrusive observation of the area in front of the vehicle. In an example embodiment, video camera 21 may be arranged in the interior of the vehicle, may be in the region of the inside mirror, so that observation of the road may be performed from the interior of the vehicle. Vehicle sensors 22 may be arranged in the vehicle at suitable points provided therefor. In an example embodiment, control unit 20 and image processing unit 23 may be arranged in the dashboard of the vehicle or in vehicle roof 2. In an example embodiment, video camera 21 may be embodied as an infrared camera, with which image acquisition may be possible even in poor visibility conditions such as darkness and fog.

Figure 4:
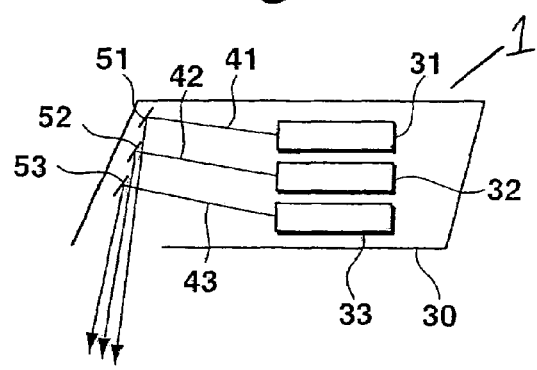
FIG. 4 illustrates an example embodiment of a projection unit according to the present invention.

FIG. 4 illustrates an example embodiment of a projection unit 1. A first laser unit 31, a second laser unit 32, and a third laser unit 33 may be arranged in a housing 30. First laser unit 31 produces red light, second laser unit 32 green light, and third laser unit 33 blue light. In an example embodiment, the laser units may be embodied as semiconductor lasers or solid-state lasers. A first laser beam 41 of first laser unit 31 may be emitted onto a first mirror 51, with which first laser beam 41 may be deflected toward display surface 4. Similarly, second laser beam 42 may be directed onto a second mirror 52, and third laser beam 43 onto a third mirror 53. Mirrors 51, 52, 53 may be modifiable, via piezoelements, in terms of their angle of inclination in two spatial directions about rotation axes lying in the plane of the respective mirror, so that scanning of display surface 4 by laser beams 41, 42, and 43 may be ensured by the mirrors. The use of the three colors red, green, and blue may allow generation of a color image. In an example embodiment, instead of the three laser units 31, 32, 33 illustrated in FIG. 4 it may be possible to use only one laser unit of one specific color. This makes possible a monochrome display in the specific color. In an example embodiment, light deflection may be accomplished with a micromechanical mirror display (DMA=digital mirror display).

Figure 5:
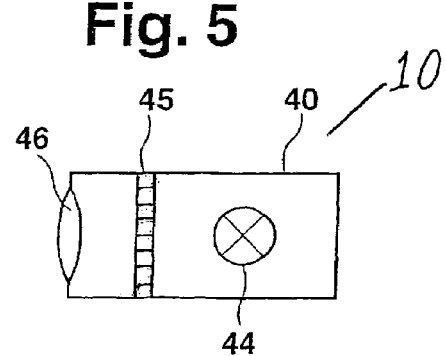
FIG. 5 illustrates another example embodiment of a projection unit according to the present invention.

FIG. 5 illustrates another example embodiment of a projection unit according to the present invention. A light source 44 may emit white light, e.g. a halogen light source, and may be arranged in a housing 40. The light of light source 44 may be emitted through a liquid crystal cell 45 and through a lens 46 toward display 4. Liquid crystal cell 45 comprises individual image points whose light transmission may be influenced by an electrical activation system. By appropriate activation of the image points, an image may be generated by liquid crystal cell 45. The spacing between liquid crystal cell 45 and lens 46 may be selected, in conjunction with the focal length of lens 46, in such a manner that the image generated by liquid crystal cell 45 is imaged onto display surface 4. Both the projection unit illustrated in FIG. 4 and that illustrated in FIG. 5 may be used as a projection unit 1 on the vehicle roof or as a projection unit 10 on an inside mirror.

Figure 6A:
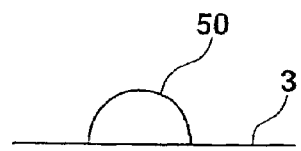
FIGS. 6a and 6b illustrate an example embodiment of a configuration according to the present invention of a display surface.
Figure 6B:
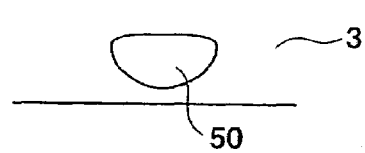

In an example embodiment, display surface 4 may be configured as a flat surface. In an example embodiment, display surface 4 may be protected from soiling or damage by a fold-down cover. FIGS. 6a and 6b illustrate an example embodiment of a semi-spherical display surface 50. Semi-spherical display surface 50 may be embodied as a semi-spherical elevation above instrument panel 3. FIG. 6a illustrates a view from the direction of the viewer at the height of instrument panel 3. FIG. 6b illustrates a plan view onto semi-spherical display surface 50 from the position of projection unit 1 or 10. The semi-spherical configuration makes possible display of an image over a wide spatial angle. As a result, an image may be seen both by a driver of the vehicle and by a passenger. It may be possible for a passenger sitting farther back in the vehicle to read from semi-spherical surface 50, which may be covered with a light-diffusing film or a light-diffusing layer. To ensure that the semi-spherical configuration does not result in distortion of the displayed image, in an example embodiment a prior computational distortion of the image, in which projection onto semi-spherical display surface 50 may be taken into account, may be accomplished in image processing unit 23.

Figure 7A:
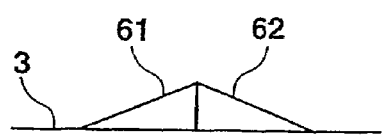
FIGS. 7a and 7b illustrate another example embodiment of a display surface according to the present invention.
Figure 7B:
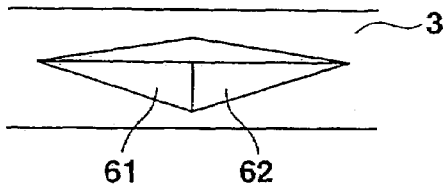

In FIGS. 7a and 7b, a display surface may be divided into a first surface portion 61 and a second surface portion 62. FIG. 7a illustrates a view onto surface portions 61 and 62 from a viewer's height corresponding to the height of instrument panel 3. FIG. 7b illustrates a plan view from the position of projection unit 1 or 10.

An image for a driver may be projected onto first surface portion 61, and an image for a passenger onto second surface portion 62, so that different images may be displayed for the driver and the passenger. In addition to an example embodiment of surface portions (illustrated in FIGS. 7a and 7b) having a triangular base outline, it may be possible to provide surface portions having a rectangular or trapezoidal display surface, or to space the surface portions apart.

Figure 8A:
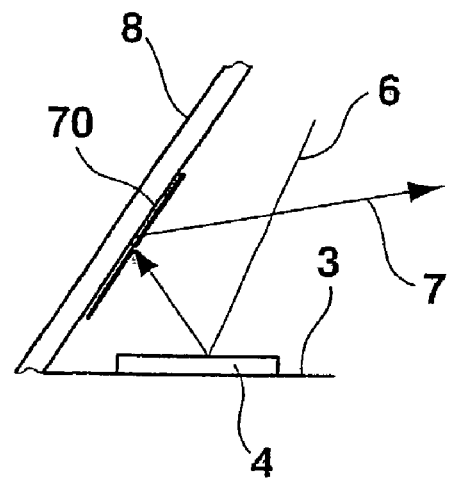
FIG. 8a illustrates an example embodiment of a configuration according to the present invention of a virtual image.

FIG. 8a illustrates an example embodiment of a display apparatus according to the present invention in which the image projected onto a display surface 4 may be deflected by display surface 4 toward windshield 8. A semi-reflective layer 70, with which light is deflected toward observer 7, may be provided on windshield 8. Reflection onto semi-reflective layer 70 creates for an observer a virtual image that appears to an observer to be located on the side of windshield 8 facing away from the observer. It may be possible to use a layer that reflects, and deflects to an observer, only light of a defined polarization direction of light beam 6 that is reflected from display surface 4. A polarization direction of the light emitted from projection unit 1 or 10 must, in this context, be adapted to the polarization direction of the semi-reflective layer, or vice versa. In an example embodiment, it may be possible to dispense entirely with a semi-reflective layer and to generate an image solely by way of a reflection at windshield 8. In the example embodiment illustrated in FIG. 8a, display surface 4 may be embodied so as to deflect as much light as possible directly toward reflective surface 70, and as little light as possible directly to an observer, in order to achieve the brightest possible virtual image. The display surface may have a light-diffracting, light-refracting, reflective, or light-diffusing structure, as well as a combination of said structures.

Figure 8B:
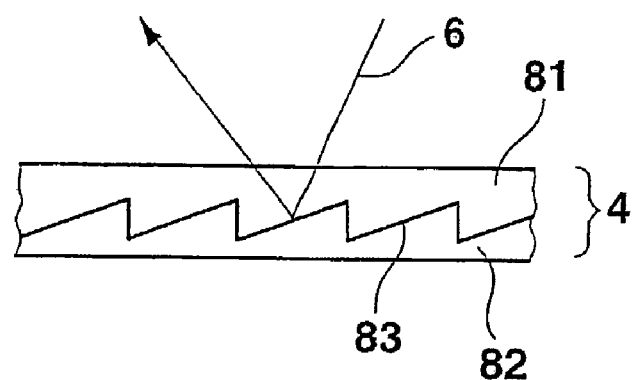
FIG. 8b illustrates an example embodiment of a configuration of an outer surface of the display surface.

FIG. 8b illustrates an example embodiment of such a structure. A light beam 6 strikes display surface 4, which may be constituted by a first layer 81 and a second layer 82. The boundary surface between first layer 81 and second layer 82 may be formed by sawtooth shapes 83. As a result of differently selected refractive indices, total reflection of light beam 6 at the boundary surface between first layer 81 and second layer 82 occurs at an interface from first layer 81 to second layer 82. This makes possible directed light deflection toward a viewer or, depending on the orientation of sawtooth shapes 83, toward reflective layer 70. First layer 81 and second layer 82 may be made from a plastic material. In an example embodiment, the structure may be introduced into second layer 82 holographically, e.g. by laser light. Instead of the sawtooth shapes illustrated in FIG. 8b, symmetrically configured prisms or other structures may be possible, for example an example embodiment as a Fresnel lens. In an example embodiment, prism or sawtooth shapes may also be applied onto an outer surface of a display surface by injection molding.

What is claimed is:

1. A display apparatus in a vehicle, comprising:
   a projection unit arranged at least one of on a vehicle roof and on an inside mirror of the vehicle; and
   a display surface, which is outside the projection unit, onto which a real image is generated by the projection unit;
   wherein the display surface is arranged on an instrument panel adjacent to a windshield,
   wherein a structural pattern is arranged on the display surface, and light is deflected by the structural pattern, and
   wherein an outer surface having at least one of a prism structure and a sawtooth structure is arranged on the display surface.

2. The display apparatus according to claim 1, further comprising:
   a reflective surface, arranged adjacent to the display surface, onto which the light is deflected.

3. The display apparatus according to claim 1, wherein the structural pattern is configured as a roughening of the display surface.

4. The display apparatus according to claim 1, wherein a layer having a holographically introduced structure is arranged on the display surface.

5. The display apparatus according to claim 1, wherein the display surface is of semi-spherical configuration.

6. The display apparatus according to claim 5, wherein the display surface includes a first surface portion for a first image and the display surface includes a second surface portion for a second image.

7. The display apparatus according to claim 6, wherein the projection unit is a video projector.

8. The display apparatus according to claim 7, wherein a light source of the projection unit is a laser beam generation unit.

9. The display apparatus according to claim 8, wherein movable mirrors are arranged in the projection unit, and light of the laser beam generation unit is deflected by the movable mirrors.

10. The display apparatus according to claim 9, wherein multiple light sources of different colors are arranged in the projection unit.

11. The display apparatus according to claim 10, wherein the path of the light from the projection unit to the display surface is at least approximately parallel to the windshield of the vehicle.

12. The display apparatus according to claim 1, wherein the display surface scatters light.

13. The display apparatus according to claim 1, wherein the projection unit includes a liquid crystal display, and the image displayed on the liquid crystal display is imaged on the display surface.

14. The display apparatus according to claim 13, wherein the display surface is arranged on an instrument panel adjacent to a windshield.

15. The display apparatus according to claim 14, wherein a structural pattern is arranged on the display surface, and light is deflected by the structural pattern.

16. The display apparatus according to claim 15, wherein the light is deflected in the direction of a viewer.

17. The display apparatus according to claim 15, further comprising:
a reflective surface, arranged adjacent to the display surface, onto which the light is deflected.

18. The display apparatus according to claim 15, wherein the structural pattern is configured as a roughening of the display surface.

19. The display apparatus according to claim 15, wherein a layer having a holographically introduced structure is arranged on the display surface.

20. The display apparatus according to claim 15, wherein the path of the light from the projection unit to the display surface is at least approximately parallel to the windshield of the vehicle.

21. A display apparatus in a vehicle, comprising:
a projection unit arranged at least one of on a vehicle roof and on an inside mirror of the vehicle; and
a display surface, which is outside the projection unit, onto which a real image is generated by the projection unit;
wherein the display surface includes a film that allows directed emission of light and prevents light from being emitted toward the windshield.

22. A display apparatus in a vehicle, comprising:
a projection unit arranged at least one of on a vehicle roof and on an inside mirror of the vehicle; and
a display surface, which is outside the projection unit, onto which a real image is generated by the projection unit;
wherein the projection unit includes a laser-beam generating unit for generating the real image with laser beams, and
wherein:
the display surface is of a semi-spherical configuration;
the display surface includes a first surface portion for a first image and the display surface includes a second surface portion for a second image;
the projection unit includes a video projector;
a light source of the projection unit includes the laser beam generation unit;
movable mirrors are arranged in the projection unit, and light of the laser beam generation unit is deflected by the movable mirrors;
multiple light sources of different colors are arranged in the projection unit; and
the path of the light from the projection unit to the display surface is at least approximately parallel to the windshield of the vehicle.

* * * * *